UNITED STATES PATENT OFFICE.

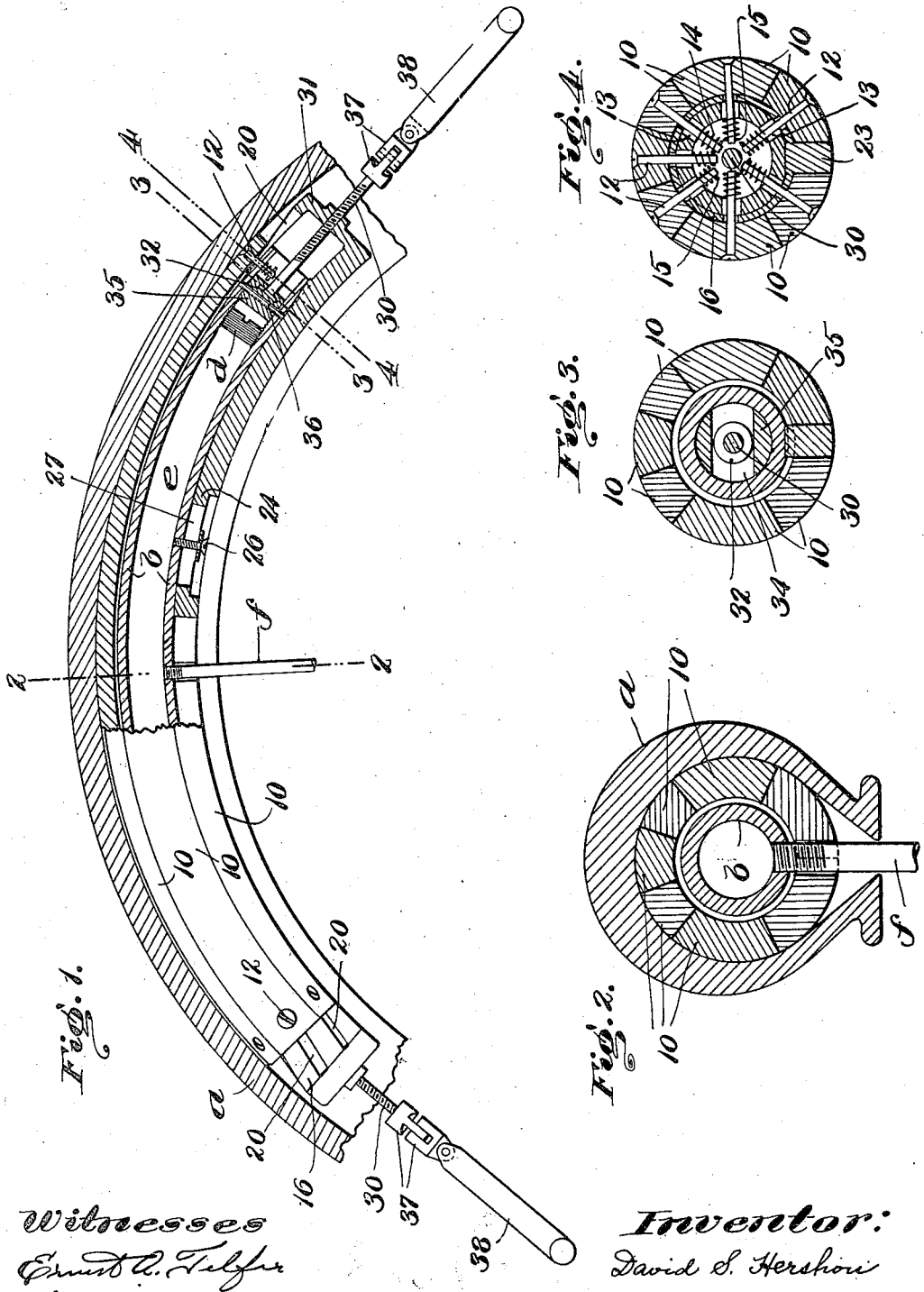

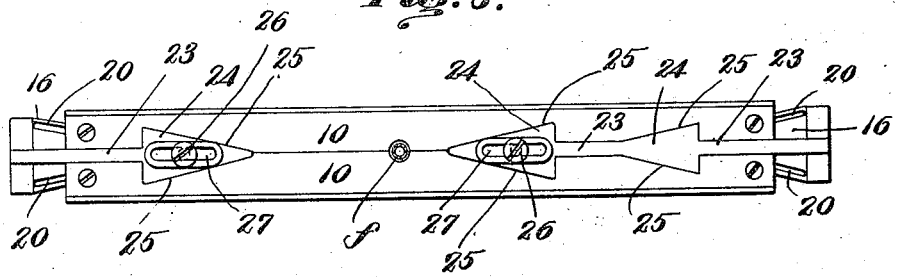
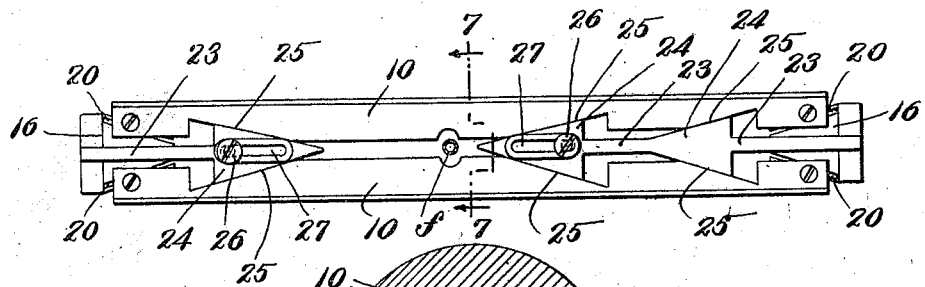
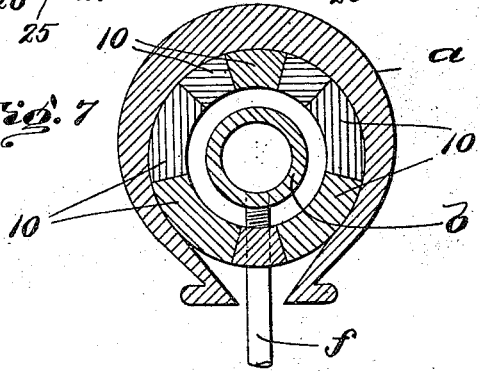

DAVID S. HERSHON, OF CHELSEA, MASSACHUSETTS.

VULCANIZING APPARATUS.

1,162,235.　　　　　　Specification of Letters Patent.　　Patented Nov. 30, 1915.

Application filed June 7, 1915. Serial No. 32,500.

*To all whom it may concern:*

Be it known that I, DAVID S. HERSHON, a citizen of the United States, residing in Chelsea, in the county of Suffolk and State of Massachusetts, have invented an Improvement in Vulcanizing Apparatus, of which the following description, in connection with the accompanying drawings, is a specification, like characters on the drawings representing like parts.

This invention relates to a vulcanizing apparatus especially designed and adapted among other uses for vulcanizing automobile tires or shoes.

The invention has for its object to provide a vulcanizing apparatus, which is used inside of the shoe and has provision for being adjusted to different sizes of shoes and for making a continuous contact with the inner surface of the shoes, so that the section of the shoe which is to be vulcanized, may be provided with a continuous support transversely of the shoe, while the latter is being vulcanized in a manner well understood.

To this end I employ an inner member of substantially the same shape in cross-section as the tire or shoe to be vulcanized, a sectional outer member supported by the inner member, and means for expanding the sectional outer member so as to cause the latter to be expanded or contracted as desired to fit the inner surface of the shoe or tire. Provision is also made for keeping the sections of the outer member in contact with one another so as to form a continuous or unbroken surface for contact with the inner surface of the shoe or tire and thus provide within limits a continuous and firm support for the shoe or tire irrespective of its diameter. The inner member is preferably made hollow and provision is made for forming a steam chamber within the same, as will be described.

These and other features of this invention will be pointed out in the claims at the end of this specification.

Figure 1 is a longitudinal section of a sufficient portion of an automobile shoe or tire provided with a vulcanizing apparatus embodying this invention, to enable the latter to be understood. Fig. 2, a transverse section on the line 2—2, Fig. 1. Fig. 3, a section on the line 3—3, Fig. 1. Fig. 4, a section on the line 4—4, Fig. 1. Fig. 5, an underside view of the apparatus shown in Fig. 1. Fig. 6, a view like Fig. 5 with the device expanded, and Fig. 7, a cross section on the line 7—7, Fig. 6, with the shoe in position.

Referring to the drawing, $a$ represents a portion of an automobile shoe or tire of known construction, which it is desired to vulcanize.

The shoe or tire $a$ has inserted within it an apparatus embodying this invention, and which is provided with an inner member $b$ of substantially the same shape in cross-section as the tire or shoe $a$ and preferably made as a hollow pipe, which, for the best results, is provided near its opposite ends with plugs $d$, only one of which is shown in Fig. 1, the said plugs forming within the hollow member $b$ a chamber $e$, which may be supplied with steam through an inlet pipe $f$.

The inner member $b$ supports an outer member composed of sections, which are capable of being expanded to contact with the inner surface of shoes or tires of different sizes within limits.

The sections of the expansible member are herein shown as metal strips 10, which may be extended lengthwise of the inner member $b$ and are attached to said inner member in such manner as to enable them to be moved with relation thereto.

In the present instance, the sections 10 are represented as provided at their opposite ends with pins or rods 12, which are extended through slots 13 in the inner member $b$ and provided within said member with springs 14 and pins 15, (see Fig. 4).

Provision is made for expanding the sectional outer member, which is accomplished as herein shown by means of hollow cones 16, which are fitted over the opposite ends of the inner member $b$ so as to move longitudinally thereon and under the sections of the outer member. The cones 16 when moved in one direction on the inner member serve to expand or enlarge the diameter of the outer member (see Figs. 2 and 7) and when moved in the opposite direction permit the outer member to be contracted.

The cones 16 may be provided with inclined slots 20 through which the pins or rods 12 are passed and which serve to move the sections 10 transversely in one direction with relation to the inner member $b$. The cones 16 serve to expand the outer member into firm engagement with the inner surface of the shoe or tire $a$, so as to firmly support the latter while the tire or shoe is being vulcanized. It is desirable for the best results, that the support for the tire or shoe should be continuous transversely of the shoe, and for this purpose, provision is made for keeping the sections 10 in contact with one another when expanded to different sizes or diameters. To this end, provision is made for moving the sections 10 transversely of the inner member $b$ and of the shoe or tire $a$, when the outer member is expanded. This result may be accomplished as herein shown, by a separating or wedging member, which may be attached to each cone 16, and, as herein shown, is interposed between two adjacent sections 10.

In the present instance, the separating member is made as a bar 23 provided with one or more tapering or wedge-shaped heads 24, which coöperate with inclined walls 25 of two adjacent sections 10 and serve to spread the adjacent sections apart when the cones 16 are moved to expand said sections, and thereby keep the sections 10 in contact with one another as they are expanded from substantially the position shown in Fig. 2 to that shown in Fig. 7. The wedging members may be integral with or attached to the cones, and may be guided in their longitudinal movement by screws or pins 26 extended through slots 27 in said members and secured to the pipe or inner member $b$.

By reference to Figs. 2, 5, 6 and 7, it will be seen that when the cones 16 are moved from the position shown in Fig. 5 to that shown in Fig. 6, the wedge-shaped heads 24 on the bars or members 23 will force the sections 10 with which they are in contact away from each other, and these sections will move the other sections transversely of the inner member $b$ and of the shoe or tire, until further movement is resisted by contact of said sections, which at such time make a continuous and firm surface for supporting the shoe (see Fig. 7), which latter is thus firmly supported at the place where it is to be vulcanized, and the parts of the shoe supported by the vulcanizer are under even strain, with the result that the shoe or tire is evenly and properly vulcanized.

Each expanding member 23 may be moved longitudinally, as herein shown, by means of a threaded rod 30, which is passed through a threaded opening in the head 31 of each cone 16 and has its inner end secured against longitudinal movement while permitting rotary movement. This is effected as shown by providing the rod 30 with a head 32 (see Figs. 1 and 3), which is entered into a T-shaped slot 34 in a stationary plug 35 located within the inner member and fastened as by a pin 36 (see Fig. 1). The outer end of the rod 30 is connected by a universal coupling 37 with a handle 38, by means of which the rod 30 can be turned to effect longitudinal movement of the cone or expanding member 16. By turning the handle 38, the threaded rod 30 is rotated and the cone is moved longitudinally on the inner member and moves the sections 10 radially to enlarge or expand the outer member, and as the sections are moved outwardly in a substantially radial direction, the lower ones are also moved transversely or laterally by the wedge-shaped head 24, so that the sections 10 are maintained in contact with one another to form a continuous or unbroken supporting surface for the inner wall of the shoe especially at the tread portion thereof. After the shoe has been vulcanized, the handle 38 is turned in the opposite direction to move the cone 16 in the opposite direction to permit the supporting member to be restored to its normal position represented in Fig. 2, which may be effected by the inclined slots 20 in the cones, assisted by the springs 14. The heat for vulcanizing the shoe may be applied in any suitable manner, but it is preferred to heat the apparatus with steam admitted into the chamber $e$ through the pipe $f$.

I have herein shown one construction of apparatus embodying the invention, but it is not desired to limit the invention to the particular construction shown.

I claim—

1. In a vulcanizing apparatus, in combination, an inner member, a sectional outer member carried by said inner member, and an expanding member movable with relation to said inner member to effect movement of said sectional outer member outwardly.

2. In a vulcanizing apparatus, in combination, an inner member, a sectional outer member carried by said inner member, an expanding member movable with relation to said inner member to effect movement of said sectional outer member outwardly, and means for moving said sections transversely of the inner member.

3. In a vulcanizing apparatus, in combination, a hollow inner member provided with a steam inlet pipe, a sectional outer member carried by said inner member, an expanding member movable between said inner and outer members and coöperating with the latter to effect movement of said sectional member outwardly away from said inner member.

4. In a vulcanizing apparatus, in combination, an inner member, a sectional outer member carried by said inner member, an expanding member to effect movement of said sectional member in one direction, and a separating member to effect movement of the sectional member in a direction substantially at right angles to the first-mentioned direction.

5. In a vulcanizing apparatus, in combination, an inner member, a sectional outer member, a hollow cone movable on the inner member and interposed between the inner and outer members and coöperating with the latter to expand the same.

6. In a vulcanizing apparatus, in combination, an inner member, a sectional outer member, a hollow cone movable on the inner member and interposed between the inner and outer members and coöperating with the latter to expand the same, and a separating member movable between adjacent sections of said outer member.

7. In a vulcanizing apparatus, in combination, an inner member, a sectional outer member, a hollow cone movable on the inner member and interposed between the inner and outer members and coöperating with the latter to expand the same, and a separating member movable between adjacent sections of said outer member and actuated by said cone.

8. In a vulcanizing apparatus, in combination, an inner member, a sectional outer member, a hollow cone movable on the inner member and interposed between the inner and outer members and coöperating with the latter to expand the same, and a separating member movable between adjacent sections of said outer member, a bar attached to said cone and provided with a wedge-shaped head which is interposed between adjacent sections of said outer member.

9. In a vulcanizing apparatus, in combination, an inner member, a sectional outer member, and a cone to effect movement of said sectional member to expand the same.

10. In a vulcanizing apparatus, in combination, an inner member, a sectional outer member, a cone to effect movement of said sectional member to expand the same, and means coöperating with the sectional member to maintain the sections thereof substantially in contact as they are expanded.

In testimony whereof I have signed my name to this specification in the presence of two subscribing witnesses.

D. S. HERSHON.

Witnesses:
  JAS. H. CHURCHILL,
  J. MURPHY.

Copies of this patent may be obtained for five cents each, by addressing the "Commissioner of Patents, Washington, D. C."